United States Patent

Olsson

[15] 3,681,744

[45] Aug. 1, 1972

[54] CIRCUIT BOARD SOCKET

[72] Inventor: Billy E. Olsson, New Cumberland, Pa.

[73] Assignee: Berg Electronics, Inc., New Cumberland, Pa.

[22] Filed: June 16, 1970

[21] Appl. No.: 46,648

[52] U.S. Cl. ............339/256 R, 174/68.5, 339/17 C, 339/275 B

[51] Int. Cl. ............................................H01r 11/22

[58] Field of Search.........339/17 R, 17 C, 17 CF, 65, 339/66, 252 R, 252 P, 262, 256, 258 R, 258 S, 258 P, 193, 192, 275, 276, 278; 113/119; 29/624–630

[56] References Cited

UNITED STATES PATENTS

| | | | |
|---|---|---|---|
| 2,510,339 | 6/1950 | Heiss | 287/126 X |
| 2,969,517 | 1/1961 | Gluck | 339/17 C |
| 2,982,935 | 5/1961 | Barnard | 339/17 R |
| 3,123,429 | 3/1964 | Anderson et al. | 339/258 R |
| 3,222,632 | 12/1965 | Fuller | 339/17 R X |
| 3,383,648 | 5/1968 | Tems | 339/17 C X |
| 3,350,680 | 10/1967 | Benoit et al. | 339/259 R X |
| 3,156,517 | 11/1964 | Maximoff et al. | 339/275 B X |
| 3,510,831 | 5/1970 | De Vito | 339/275 B X |

FOREIGN PATENTS OR APPLICATIONS

| | | | |
|---|---|---|---|
| 726,662 | 3/1932 | France | 339/262 |
| 205,433 | 8/1956 | Australia | 339/67 |

*Primary Examiner*—Stephen J. Novosad
*Assistant Examiner*—Terrell P. Lewis
*Attorney*—Thomas Hooker

[57] ABSTRACT

A miniature circuit board disconnect socket which may be positioned in a circuit board hole and dip-soldered to form an electrical connection with printed circuitry on both sides of the board. The socket includes an elongate socket body of square cross section which is closed at one end and open at the other end. A spring contact formed of strip stock is confined within the body to make electrical connection with a lead inserted into the socket.

20 Claims, 15 Drawing Figures

INVENTOR.
Billy E. Olsson
BY
Thomas Hooker,
His Attorney

INVENTOR.
Billy E. Olsson
BY
Thomas Hooker
His Attorney

INVENTOR.
Billy E. Olsson
BY
Thomas Hooker
His Attorney

CIRCUIT BOARD SOCKET

The invention relates to a improved miniature circuit board disconnect socket which may be positioned in a circuit board hole and wave-soldered to printed circuitry on one or both sides of the board. The socket is used to form a reliable electrical connection between circuitry on the board and a lead inserted into the socket. A number of sockets may be arranged in close proximity to one another on the circuit board and used to form disconnect connections between circuit elements, such as integrated circuit modules, and circuitry on the circuit board.

A number of circuit board disconnect sockets have been proposed for use in establishing a disconnect contact between a lead and printed circuitry on the board. See U.S. Pat. Nos. 2,969,517 and 3,222,632. A similar socket is disclosed in U.S. Pat. No. 2,510,339. The conventional circuit board sockets possess a number of disadvantages.

The conventional socket is circular in cross section and has a lip at the open end. In order to form a solder connection with printed circuitry on the top of the circuit board the socket must be loosely seated in the circuit board hole. In practice, the conventional socket is dropped into a clearance hole in the circuit board. The lip of the socket acts as a stop to prevent the socket from falling through the hole. During soldering, the loosely seated socket is likely to be floated out of the circuit board hole by the molten solder. Because the socket lip rests on the circuit board, the open end of the socket may be flooded by solder during dipping, thereby preventing use of the socket as a disconnect.

The conventional circuit board solder contact is not intended for use in making an electrical connection with a flat lead of the type used in integrated circuit modules. Rather, these contacts are adapted to receive round leads.

Conventional circuit board sockets are manufactured as loose parts and must be individually oriented, picked up and then inserted into the circuit board. On a mass production basis, this type of assembly operation is slow and expensive.

The invention relates to an improved solder-type circuit board disconnect socket having an elongate socket body preferably drawn from copper stock and plated on the outside to improve its soldering characteristics. The body is generally square in cross section so that when it is positioned in a plated circuit board hole there are four solder flow channels extending through the thickness of the circuit board defined by the flat exterior surfaces of the socket body and the plated surface of the hole.

A U-shaped spring contact preferably formed from a strip of beryllium-copper is confined within the socket body with the bight of the spring adjacent the closed end of the socket. The legs of the spring extend toward the open end of the socket along flat interior sides and are mechanically and electrically secured to the socket adjacent the open end with the flat sides of the legs abutting the opposite flat interior surfaces of the socket. The ends of the legs adjacent the bight portion of the spring slideably engage the same interior sides of the socket.

Contact portions of the spring legs intermediate the connection between the legs and the socket body and the portions slideably engaging the socket body are bent into the interior of the socket body. When a lead is inserted into the socket the contact portions are spread apart and the spring is elongated in the direction of the insertion of the lead so that the bight portion is moved toward the closed end of the body. The elongation of the spring in the direction of insertion reduces binding between the spring and the lead during insertion.

The U-shaped beryllium-copper spring provides redundant high pressure electrical contacts between the lead and the socket. In a miniature disconnect socket, the use of the square body with the generally flat beryllium-copper spring results in a compact assembly with uniform contact characteristics despite repeated insertions of the lead into the socket. The square socket construction permits the use of a spring of maximum size in the interior of the socket and results in an electrical contact having a very high contact force for its given size. This feature assures the reliability of the electrical connections formed with a lead inserted into the socket and permits close spacing of sockets on the circuit board.

The corners and closed end of the drawn socket body are somewhat rounded to facilitate insertion of the socket into a circuit board hole. A flared lead-in is provided at the open end of the socket in order to facilitate insertion of the lead into the socket. The ends of the spring legs are bent over the open end of the socket adjacent the side walls to which the spring is secured and provide means for indicating the angular orientation of the socket in the circuit board hole. In this way the socket may be oriented to receive a flat I-C or similar lead.

The lead socket springs are preferably formed from a long strip of flat spring stock material as integral parts of a carrier strip. After the springs have been formed, the drawn sockets are positioned around the springs and are secured to the springs. By providing a carrier strip for the lead sockets, it is possible to feed the sockets to an applicator with each individual lead socket orienting in a known position. The applicator then picks up the sockets, severs them from the carrier strip and inserts them into the circuit board in proper orientation. This manufacturing operation may be carried out rapidly and inexpensively by automatic applicators.

In some cases where the sockets are to be mounted on circuit board where the diameters of the socket holes are not uniform, the holes may be sized by inserting a tapered tool having a square cross section of the same dimension as the cross section of the socket but with sharp corners into the holes so that the corners bite into the circuit board material and form four grooves in the walls of the hole. The tool is withdrawn and a lead socket may then be inserted into the hole with the corners of the socket fitted into the sized grooves of the hole. This method of positioning the lead socket in the circuit board hole assures that the socket seats in the hole and is angularly oriented properly with respect to the hole.

Projections may be formed on the corners of the socket to hold the socket in the circuit board hole before and during soldering. These projections wipe against the sides of the circuit board hole during insertion of the socket. In this way the socket fits different sized holes. The projections are seated in tight solder free contact with the circuit board hole so that the socket does not move during soldering.

After the lead sockets are physically mounted on a circuit board, the board may be wave-soldered in order to form an electrical connection between the socket board and the printed circuitry on the bottom of the circuit board. If the circuit board is double-sided and the circuit board holes are plated, solder and flux will flow up through the four channels defined by the flat sides of the socket body and the surface of each circuit board hole so as to form a reliable solder connection between the socket and printed circuitry on the top of the circuit board above the solder bath. During soldering the seamless drawn socket body prevents solder from wicking into the interior of the socket. The socket is press fitted into a circuit board hole to a desired height above the circuit board thereby preventing solder flooding.

A highly reliable physical and electrical connection is formed between the socket body and the spring confined in the body. The electrical connection includes a redundant number of wiped connections to assure low contact resistance.

Other objects and features of the invention will become apparent as the description proceeds, especially when taken in conjunction with the accompanying drawings illustrating the invention, of which there are three sheets.

Figures 1, 2, 4, 14:
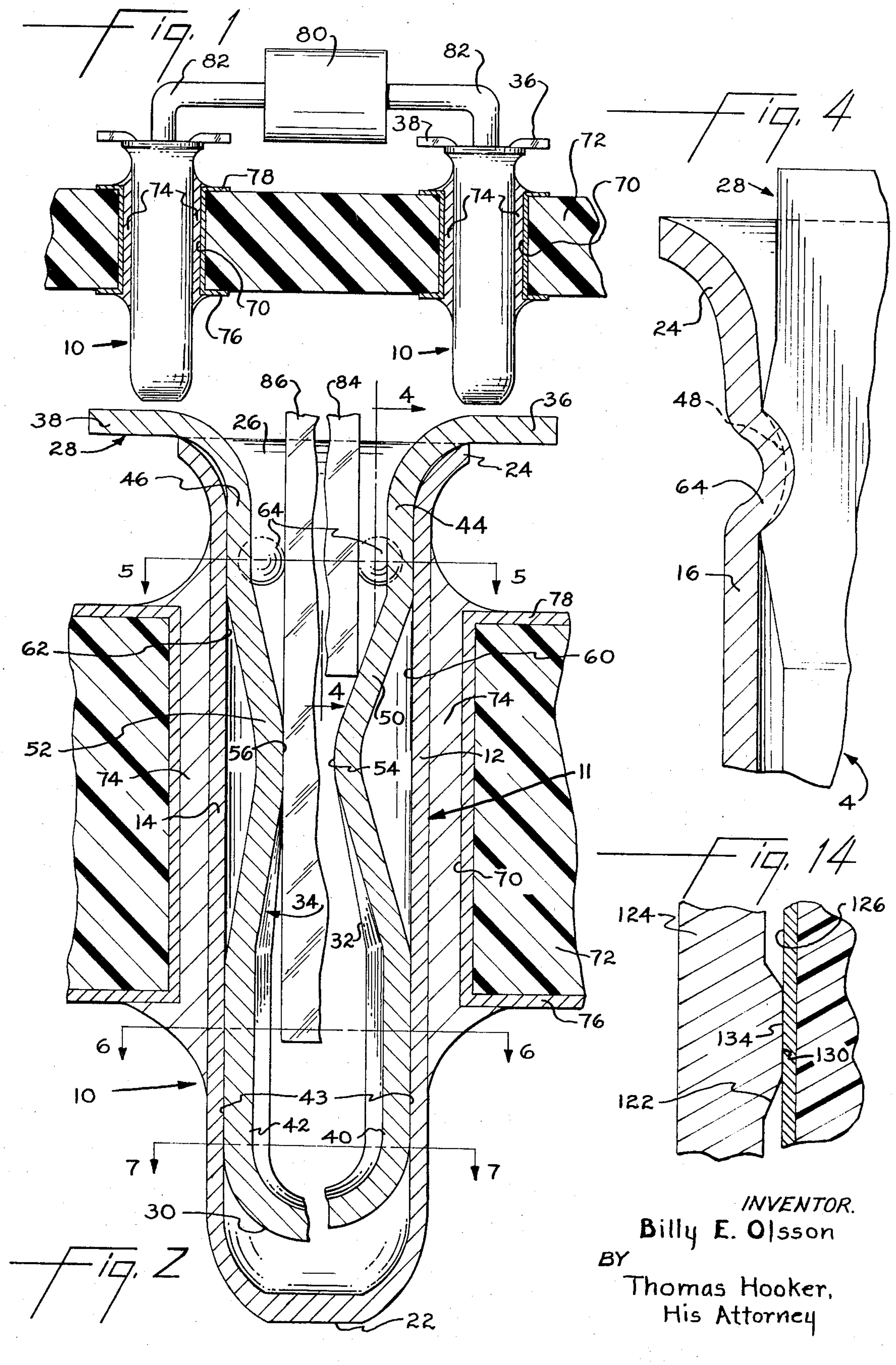
FIG. 1 is a sectional view taken through the thickness of a circuit board, illustrating the use of disconnect sockets according to the invention.
FIG. 2 is an enlarged sectional view taken through the center of a circuit board socket which is soldered to a circuit board, illustrating the movement of the contact spring during insertion of a lead into the socket.
FIG. 4 is a partial sectional view taken along line 4—4 of FIG. 2, illustrating the connection between socket body and the spring contact.
Figures 3, 5, 6, 7, 12, 13:
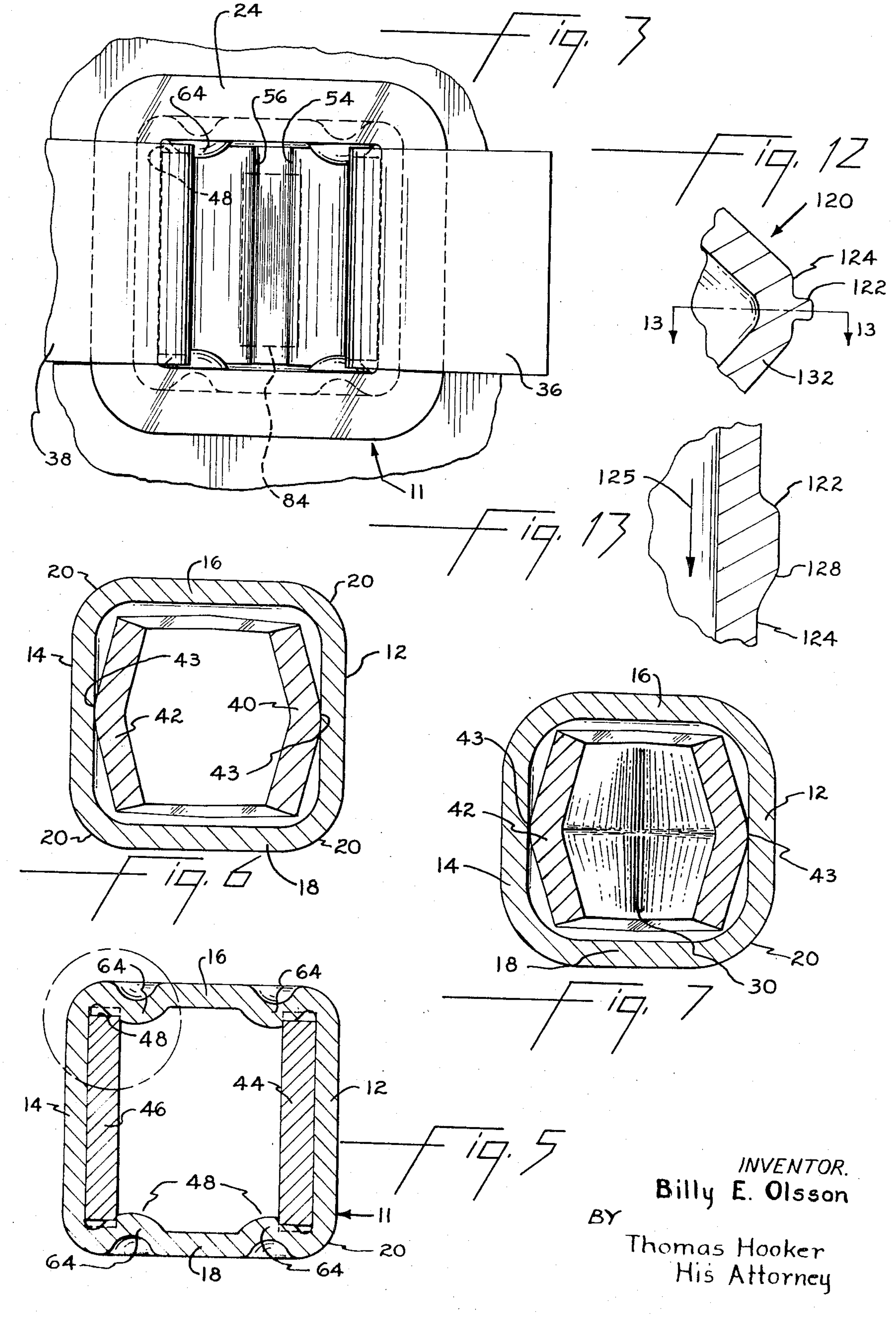
FIG. 3 is an elevational view of a circuit board socket on a circuit board.
Figure 11:
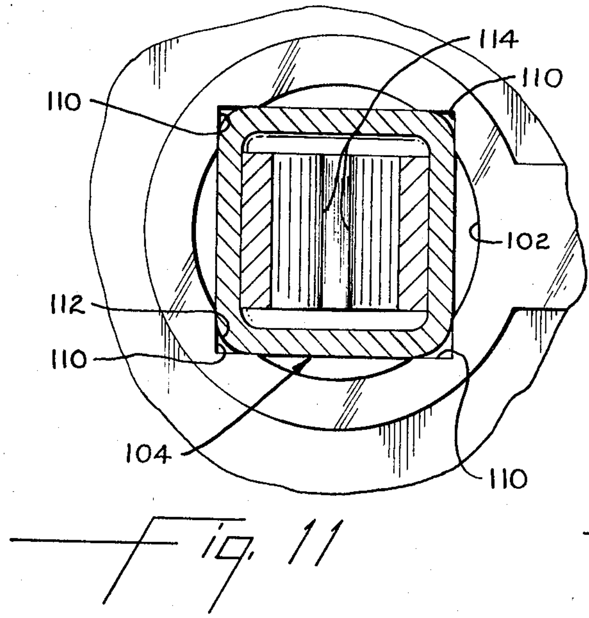
Figure 10:
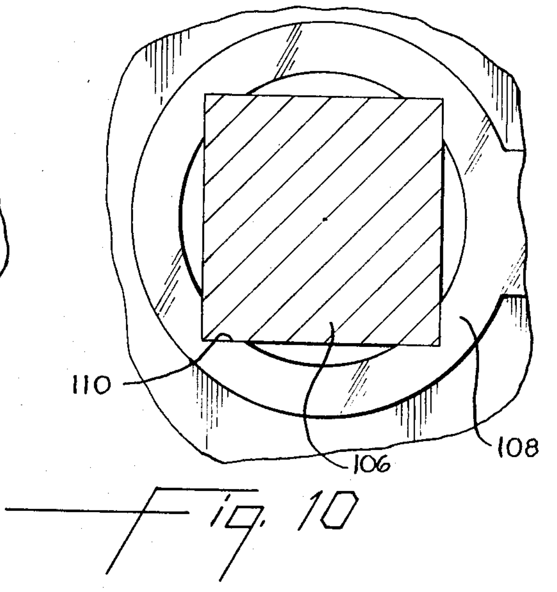
Figures 8, 9, 15:
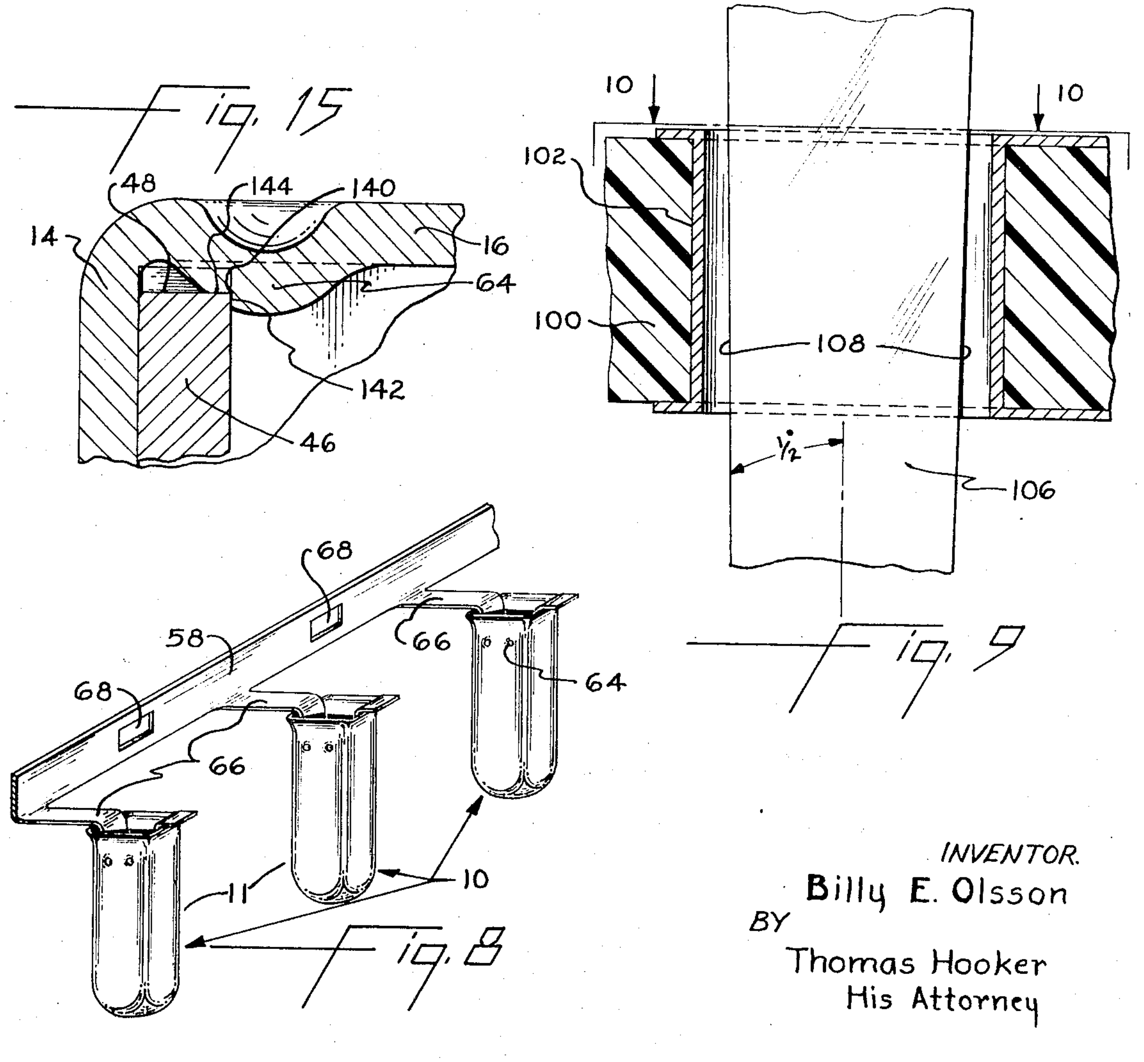

FIGS. 5, 6 and 7 are horizontal sectional views taken along lines 5—5, 6—6 and 7—7 respectively of FIG. 2;

FIG. 8 is a perspective view illustrating a portion of a chain of circuit board sockets;

FIG. 9 is a sectional view taken through a circuit board illustrating the use of a sizing tool in preparing a circuit board hole to fit a circuit board socket;

FIG. 10 is a view taken along line 10—10 of FIG. 9;

FIG. 11 is a view similar to FIG. 10 except that the tool has been removed and a circuit board socket has been seated in the circuit board hole;

FIG. 12 is a horizontal sectional view taken through a corner of a disconnect socket illustrating a modification of the socket;

FIG. 13 is a sectional view taken along line 13—13 of FIG. 12;

FIG. 14 is a vertical sectional view illustrating the engagement between the corner of a socket as in FIG. 13 and the circuit board hole; and FIG. 15 is an enlarged view of one corner of the socket of FIG. 5, illustrating the connection between the spring and socket body.

A circuit board socket 10 comprises an elongate hollow metal body 11 having a generally square cross section, as illustrated in FIGS. 5, 6 and 7, which is defined by four longitudinally extending flat side walls 12, 14, 16 and 18. The corners 20 between adjacent side walls are rounded. The radius of curvature of the corners increases adjacent body closed end 22 so that the body is tapered slightly along its length and is provided with a rounded lead-in at end 22. A flared funnel-type lead-in is located in the open end 26 of body 11 away from closed end 22.

Preferably body 11 is manufactured by a drawing operation so that during dip soldering the seamless body prevents solder from seeping into the interior of the body. The outside surface of the body may be plated with tin or solder in order to improve solder adherence.

A generally U-shaped spring contact 28 is confined within the hollow interior of body 11. The spring contact is preferably formed from a strip of highly resilient spring material such as beryllium-copper. The bight portion 30 of the spring is positioned adjacent closed end 22 of the body and like spring legs 32 and 34 extend from the bight portion along the flat interior walls of opposite body side walls 12 and 14 toward open end 26. The ends 36 and 38 of legs 32 and 34 are bent over the lead-in 24 and extend away from the body 11 as best illustrated in FIG. 2.

Referring now to FIG. 2, portions 40 and 42 of legs 32 and 34 slideably abut the inner sides of walls 12 and 14 at crests 43 so that these portions are free to move relative to the walls. The edges of these portions, and of bight portion 30, are bent away from the sides of the body in order to fit within the body. This construction permits the use of a spring member having a maximum amount of metal for high-contact pressure connections with leads. Portions 44 and 46 of legs 32 and 34 lie flush against the interior faces of side walls 12 and 14 as illustrated in FIG. 5. A pair of convex recesses 48 are formed in the lateral edges of strip portions 44 and 46. The width of the strip portions adjacent the recesses 48 is increased somewhat so that the recesses lie close to side walls 16 and 18 as shown best in FIG. 5.

Spring contact portions 50 and 52 are located on legs 32 and 34 between the portions 40 and 42 and portions 44 and 46. The contact portions 50 and 52 of the strip spring are formed by bending of the strip stock away from walls 12 and 14 so that opposing contact crests or ridges 54 and 56 are formed. The spring strip at crests 54 and 56 is spaced from side walls 12 and 14 to permit flexing of the spring during insertion of a lead into the socket.

The assembly of a lead socket 10 will now be described. Spring member 28 is formed from a strip 58 of beryllium-copper. The spring is then inserted into the pre-formed socket body 11 to position the leg ends 36 and 38 adjacent lead-in 24. In this position the bight portion 30 is spaced from closed body end 22. With the spring seated in the socket and leg portions 44 and 46 flush against the flat interior sides 60 and 62 of side walls 12 and 14 inwardly directed dimples 64 are formed in side walls 16 and 18 adjacent recesses 48 so that the domed surface of the dimples engages the edges of the recesses away from walls 12 and 14 and holds the portions against the surfaces 60 and 62 to form reliable physical and electrical connections between the spring contact 28 and socket body 11. The dimples do not pierce walls 16 and 18 so that there is no impairment of the physical integrity of socket 11 and solder cannot seep into the interior of the socket at the dimples. The contact between the dimples and the spring recesses 48 occurs on the surface of the dimple facing the adjacent side walls 12 and 14 so that during the formation of the dimples the spring portions 44 and 46 are forced tightly against the side walls. The connection between the spring and socket body may be established by means other than dimples 64.

Because of the square cross section of the socket body 11, it is possible to insert a spring formed of flat spring stock within the socket. This construction permits the use of a large and relatively strong spring in a small socket and enables the socket to have a high contact pressure with the lead inserted therein. The compact construction of the socket permits close spacing of sockets on circuit boards, for instance for a socket having a 0.038 inches square cross section, the center to center spacing between adjacent sockets may be as little as 0.075 inches. Despite the miniature size of this socket, the reliability of the electrical connection between the socket and the lead inserted into the socket is not sacrificed.

FIG. 8 illustrates a portion of a lead socket chain of indefinite length. Each socket 10 is connected to the carrier strip 58 by means of a laterally extending severably strip portion 66 which joins one of the ends 34 and 36 of each spring. The sockets 10 are spaced at regular intervals along strip 58 and the strip is provided with a number of regularly spaced feed holes 68. These holes are useful in feeding the strip within an applicator so that the lead terminal of the strip is located in a work position. Each socket 10 is held in a fixed position relative to the strip portion 66 so that the lead socket is always oriented in a known position in the applicator.

The terminal strip of FIG. 8 differs from conventional terminal strips in that the contact springs 28 are formed from an integral part of strip 58 while the socket bodies 11 are not part of the strip 58. It is not possible for the bodies 11 to be part of a strip because they are formed as a loose part by a drawing operation. The bodies cannot be formed by a stamping operation so as to be an integral part of a carrier strip because such bodies would include a seam which would admit solder into the interior of the bodies during solder dipping. Solder inside the socket would impair the functioning of the spring contact.

As illustrated in FIGS. 1 and 2 of the drawings, circuit board sockets 10 are seated in holes 70 formed through the thickness of circuit boards 72. The interior surface of circuit board holes 70 are plated. With the sockets inserted in the holes, the flat exterior faces of socket side walls 12, 14, 16 and 18, cooperate with the plated surface of holes 70 to define four solder flow passages 74 which extend from the bottom of the circuit board. A printed circuit pad 76 surrounds the bottom of hole 70 and a printed circuit pad 78 surrounds the upper end of the hole. The sockets are inserted in holes 70 with a proper angular orientation relative to their longitudinal axis so that the contact portions of the spring 28 will be positioned to engage the flat side surfaces of the lead to be inserted into the socket. This orientation can be visually checked by inspection of the orientation of the spring ends 36 and 38 which project from the socket.

When the sockets are inserted into the board, the rounded corners 20 of the socket body 11 engage the sides of the circuit board hole 70 and hold the socket in the hole. The rounded closed end 22 of body 11 provides a lead-in to facilitate insertion of the socket into the hole.

After the sockets have been positioned in the circuit board in proper angular orientation, the board 72 may be solder dipped so that the bottom surface thereof is exposed to a molten bath of solder. The solder from the bath flows upwardly through channels 74 so that the channels are filled with solder and a reliable solder connection is formed between the socket and the printed circuitry 78 on the surface of the board 72 away from the solder bath. A reliable solder connection is also formed between the socket and the circuitry 76 on the bottom of the circuit board.

While circuit board 72 disclosed herein is provided with plated holes 70 so that the solder dipping results in the formation of a solder connection between the socket and the printed circuitry on both sides of the board, the sockets 10 may be used with single-sided printed circuit boards having circuitry on one side only and it is not intended that the invention be limited in any way by the type of circuit board or substrate on which the socket is mounted.

Circuit board components such as integrated circuit modules may be mounted on circuit board 72 by inserting component leads 82 into the sockets 10 so as to form an electrical connection between the sockets. The leads are usually rectangular in cross section and are inserted into the sockets so that the flat side faces thereof engage the contact crests 54 and 56 of the spring 28. FIG. 1 illustrates a circuit element 80 mounted on board 72 with leads 82 extending into and establishing an electrical connection with sockets 10.

FIG. 2 illustrates the position of flat lead 84 during insertion immediately prior to engagement with the contact portion 50 of spring leg 32. The thickness of the lead 84 is greater than the spacing between the contact crests 54 and 56 (see FIG. 3) so that insertion of the lead into the socket brings the end of the lead into engagement with the contact portions 50 and 52 of the spring. Further insertion of the lead into the socket forces the contact portions 50 and 52 apart until the contact crests or ridges 54 and 56 ride on the flat sides of the lead. Lead 86 of FIG. 2 is shown at the fully inserted position with contact crests 56 engaging the flat side of the lead.

As the contact portions 50 and 52 of the spring contact are forced apart, the spring is elongaged and the portions 40 and 42 thereof adjacent bight portion 30 slide along walls 12 and 14. The elongation of the spring member as the spring is stressed during insertion is in the direction of movement of the lead into the socket so that binding between the lead and socket is reduced. After the spring is stressed, contact crests 54 and 56 are wiped along the sides of the lead to assure reliable connections are formed.

When the lead is fully inserted into socket 10, the spring tension 28 provides high contact pressure between contact crests 54 and 56 and the sides of the lead. The legs of spring 28 are backed-up by the side walls of the socket to each side of contact portions 40 and 42 so that the contact portions 50 and 52 are highly stressed by the lead during insertion and a desirable high contact pressure connection is achieved.

While the socket in 10 has been described in connection with the use of a flat lead contact, it is not intended that the invention be limited to use with such a contact. Obviously, the socket may be used for making an electrical connection with a lead of different geometry than the flat leads as used on certain types of I-C modules.

FIGS. 9, 10 and 11 illustrate a way in which a circuit board hole may be sized to accommodate a socket 10. It is very difficult to manufacture holes through the thickness of circuit boards with the diameter of the hole maintained to exacting tolerances. In circuit boards where the diameters of circuit board holes are not uniform, it is difficult to set sockets 10 in the circuit board holes to the proper depth and form a reliable solder connection between the sockets and printed circuitry on the board.

FIG. 9 illustrates a circuit board 100 having a plated circuit board hole 102 extending through the thickness thereof. The diameter of the hole 102 is somewhat smaller than the diagonal cross section dimension of socket 104, which is to be seated within the hole.

In order to properly size the hole to rèceive the socket, a tapered sizing tool or broach 106 is inserted into the hole. This tool has a square cross section of generally the same dimension of the cross section of the socket 104 with the exception that the corners 108 are sharp. As the tool is inserted into the hole 102, the sharp corners 108 bite into the edges of the hole to form four grooves 110 in the sides of the hole. These grooves extend along the side of the hole parallel to the axis of the hole. The tool 108 may be tapered to a slight extent, such as one-half of a degree in order to facilitate forming of grooves 110. When the grooves are formed the tool is held in the desired angular orientation of the socket in the hole.

After the grooves have been formed, the tool is removed from the hole and the socket 104 may be positioned in the hole with socket corners 112 seated in grooves 110. Because the grooves have been formed in hole 102 in proper angular orientation, the socket will be properly oriented on the board 100. The relative ease of forming grooves 110 in circuit board material permits the use of this method of sizing circuit board holes for the reception of sockets 104 in holes having a relatively large range of diameters. The hole to be sized must be smaller in diameter than the cross sectional dimensions of the socket to be mounted in the sized hole.

FIGS. 12, 13 and 14 illustrate a circuit board socket 120 which is identical to circuit board socket 10 with the exception that thin ears 122 project outwardly of the corners 124 of the socket body. The ears 122 may be formed by a coining or pinching operation and are located on all four corners 124 or on a pair of opposing corners. When the socket 120 has been inserted into an oversized circuit board hole 126, the ears will be positioned within the thickness of the board. The ears extend outwardly from corners 124 a few thousandths of an inch. As illustrated in FIG. 13, the ears 122 are provided with a lead-in surface 128 which slopes away from the corner 124 to the crests of the ears, and facilitates positioning the socket in the circuit board hole. The socket is moved in the direction of arrow 125 during insertion into the circuit board hole.

When the socket 120 with ears formed at corners 124 is inserted into a circuit board hole 126 having a diameter slightly greater than the diagonal cross section of the socket, the ears 122 engage the plating 130 in the hole so that the hard plating wipes or shears away the crests of the ears to form a tight connection between the metal of body 132 and the plating 130 in the circuit board hole. The solder or tin plating on the surface of end 122 is wiped away and does not form part of the connection between the socket and the circuit board. During solder dipping the metal to metal connection 134 between ears 122 and plating 130 holds the socket 120 in place in the circuit board until the solder drawn into the circuit board hole cools. If the connection between the ears and the hole included a thickness of solder plating, solder dipping would melt the plating and the socket would move or float in the hole. Because of the very small size of ears 122, they are easily wiped or sheared away as in FIG. 14 so that socket 120 may be fitted within oversized circuit board holes.

FIG. 15 illustrates the mechanical and electrical connection formed between the socket body and the spring confined within the body. As mentioned previously, the dimples 64 are formed in body side walls 16 and 18 so that the domed surfaces of the dimples engage the edges of the recesses 48 in the spring portions 46. When the dimples are formed, the portions 46 of the spring are confined against the sides of the socket body. Thus, as the dimples are struck or formed from the socket side walls, the domed surfaces of the dimples are moved into engagement with the sharp edges 140 of fixed strip portions 46. The domed surface of each dimple is then moved past the adjacent spring edge to bury the edge in the dimple. Portions of the dimple body to either side of the edge are wiped past the sides 142 and 144 of the spring which define the edge.

After the dimple has been fully formed, as illustrated in FIG. 15, the contacts between the dimple and each spring side 142 and 144 form a pair of reliable wiped, metal to metal electrical contacts between the two socket members. The contacts are separated by the edge. The dimples engage each spring leg on both sides of portions 46 and physically confine the spring within the body.

In the circuit board socket 10 the spring is secured in the socket body by four dimple connections. This means that eight independent electrical connections are provided between the body and the spring. The high redundancy of electrical connections between the two socket members, together with the reliability of each connection, assure a low contact resistance between the members. The contact resistance is minimally affected by corrosive elements.

While I have illustrated and described preferred embodiments of my invention, it is understood that they are capable of modification, and I therefore do not wish to be limited by the precise details as set forth, but desire to avail myself of such changes and alterations that fall with the preview of the following claims.

What I claim as my invention is:

1. A disconnect type lead socket adapted to be soldered to a circuit board or the like comprising an elongate hollow metal body having an open and a closed end and opposed interior side walls, said body being impervious to molten solder away from the open end, and a contact spring confined within said body, said spring comprising a generally U-shaped strip of spring metal having a bight portion adjacent to but spaced from the closed end of the body and a pair of legs extending from the opposite ends of the bight portion along said walls of the body toward the open end thereof, said legs being connected to said body adjacent the open end thereof, the portions of said legs adjacent the closed end of said body slidably engaging the side walls of said body, said legs including lead contacts intermediate said portions and the connections between the spring and said body, said contacts projecting into the interior of said body away from said side walls whereby upon insertion of a lead into the socket and past said contacts the contacts are spread apart to form an electrical connection with the lead and said spring is elongated in the direction of insertion of the lead into the socket.

2. A disconnect type lead socket as in claim 1 wherein said body is generally square in cross section; said spring side walls are located between opposite flat body side walls; and the flat outside side walls of the body form sides of solder flow passages in the circuit board hole extending through the thickness of the circuit board.

3. A disconnect type lead socket as in claim 1 wherein said body includes at least one flat longitudinally extending external surface whereby when said socket is positioned in a circuit board hole such surface and the hole defined a solder flow passage extending through the thickness of the circuit board.

4. A disconnect type lead socket as in claim 3 wherein the ends of the spring are bent over the edges of the body at the open end thereof.

5. A disconnect type lead socket as in claim 1 including means at the open end of said body for indicating the angular orientation of the socket in a circuit board hole.

6. A disconnect type lead socket as in claim 5 whereby said means comprises a part of said spring extending from said socket.

7. A disconnect type lead socket as in claim 2 wherein one end of said spring extends from the open end of said body so as to indicate the angular orientation of the socket in a circuit board hole.

8. A disconnect type lead socket as in claim 1 including a shearable contact ear extending outwardly from the exterior of said body for engagement with the wall of a circuit board hole whereby the socket may be fitted in an oversized circuit board hole.

9. A disconnect type lead socket as in claim 4 wherein shearable contact ears extend away from said body at outside corners thereof whereby the socket may be fitted into an oversized circuit board hole.

10. A disconnect type lead socket as in claim 1 wherein said legs are bent over opposing edges of the open end of said body.

11. A disconnect type lead socket adapted to be fitted into a circuit board hole and soldered to circuitry on the circuit board comprising an elongate hollow solder impervious body having a closed end and an open end, and a spring contact confined within said body for making an electrical connection with a lead inserted into said socket, the exterior surface of said body including at least one ear projecting laterally outwardly from said body and adapted to engage the interior surface of a circuit board hole whereby said socket may be fitted into an oversized circuit board hole.

12. A contact strip of indefinite length comprising a carrier strip formed of spring metal stock, a plurality of spring contacts formed from integral portions of said strip spaced along said strip at regular intervals, a severable lead portion of said strip joining each contact to said strip, a plurality of separate elongate hollow solder impervious socket members, each spring contact extending into the interior of one socket member, and a connection formed between each spring contact and its surrounding socket.

13. A contact strip as in claim 12 wherein said contacts are generally U-shaped portions of said strip and are positioned within said socket members with the bight portions adjacent closed socket ends and the leg portions bent over the open ends of the socket members.

14. A circuit board socket comprising an elongate socket body having an open end, a spring contact fitted within the body for establishing an electrical connection with a lead inserted into said socket body through the open end thereof, a sharp edge on said spring within said body, and a projection on an inner wall of the socket body extending toward and past said edge with the edge buried within the projection and a pair of independent, wiped electrical contacts formed between the spring and the projection, said contacts lying to either side of the edge.

15. A circuit board socket as in claim 13 wherein said body is provided with a closed end opposite said open end and is seamless, and said projection comprises a convex dimple formed in the socket body side wall without puncturing side wall.

16. A circuit board socket as in claim 14 wherein said spring is formed from a strip of flat spring stock and a portion of said spring is secured to the socket body by two laterally spaced dimple and edge connections whereby four independent electrical contacts are formed between the spring and the body.

17. A disconnect type lead socket adapted to be soldered to a circuit board comprising an elongate hollow metal body having a closed end and an open end, said body being impervious to molten solder away from said open end; and a spring contact confined within the body and forming part of an electrical connection with circuitry on a circuit board to which the socket is soldered; the spring contact comprising a generally U-shaped member having a bight portion and a pair of legs extending away from the bight portion in generally the same direction, the spring being positioned within the body with the bight portion adjacent but spaced from the closed end of the body and with the legs extending along the interior walls of the body toward the open end of the body; a connection between the free end of each of the legs and the body adjacent the open end of the body to prevent movement of the leg ends toward the closed end of the body, each leg including a contact portion intermediate the connection adjacent the open end of the body and the bight portion, said contact portions being bowed away from the interior walls of the body; the portions of the legs between the contact portions and the bight portions slidably engaging the interior of the body whereby upon insertion of a lead into the body through the open end thereof, the lead engages the contact portions to force them apart and form an electrical connection with the spring and elongate the same to move the bight portion toward the closed end of the body.

18. A disconnect type lead socket adapted to be soldered in a circuit board hole comprising an elongate hollow and solder impervious metal body open at one end; a generally U-shaped spring formed of flat strip stock confined within the body with the reverse bend portion adjacent the closed end of the body and the legs extending along the interior sides of the body, the ends of the legs being bent over the edge at the open end of the body; and lead contacts on the spring legs spaced from the interior of the body and spaced apart from each other a distance less than the spacing between the legs at the open end of the body.

19. A disconnect type lead socket as in claim 18 wherein the open end of the body is flared outwardly.

20. A disconnect type lead socket adapted to be soldered in a plated circuit board hole comprising an elongate hollow metal body of rectangular cross section having generally flat interior and exterior side walls, an open end and a closed end, and opposed interior side walls, said exterior side walls intersecting at four longitudinally extending corners for engagement with the circuit board hole, said body being imperforate and seam free away from said open end so as to form a barrier to the flow of molten solder from outside the body into the interior of the body away from the open end thereof; and a spring contact confined within the interior of the body including a pair of spring arms having opposed lead contacts normally located away from the interior side walls of the body to permit retention of a lead inserted into the socket through the open end of the body and between the spring arms.

* * * * *